July 3, 1956  M. OLESKOW  2,752,893
FLUID MOTOR
Filed June 10, 1953  2 Sheets-Sheet 1
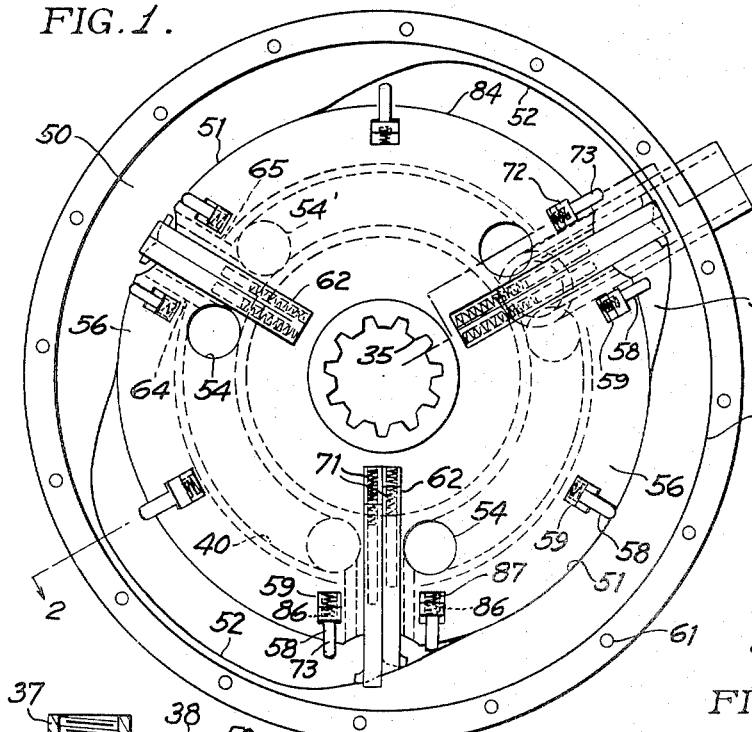
INVENTOR.
Mathew Oleskow.
BY
ATTORNEY.

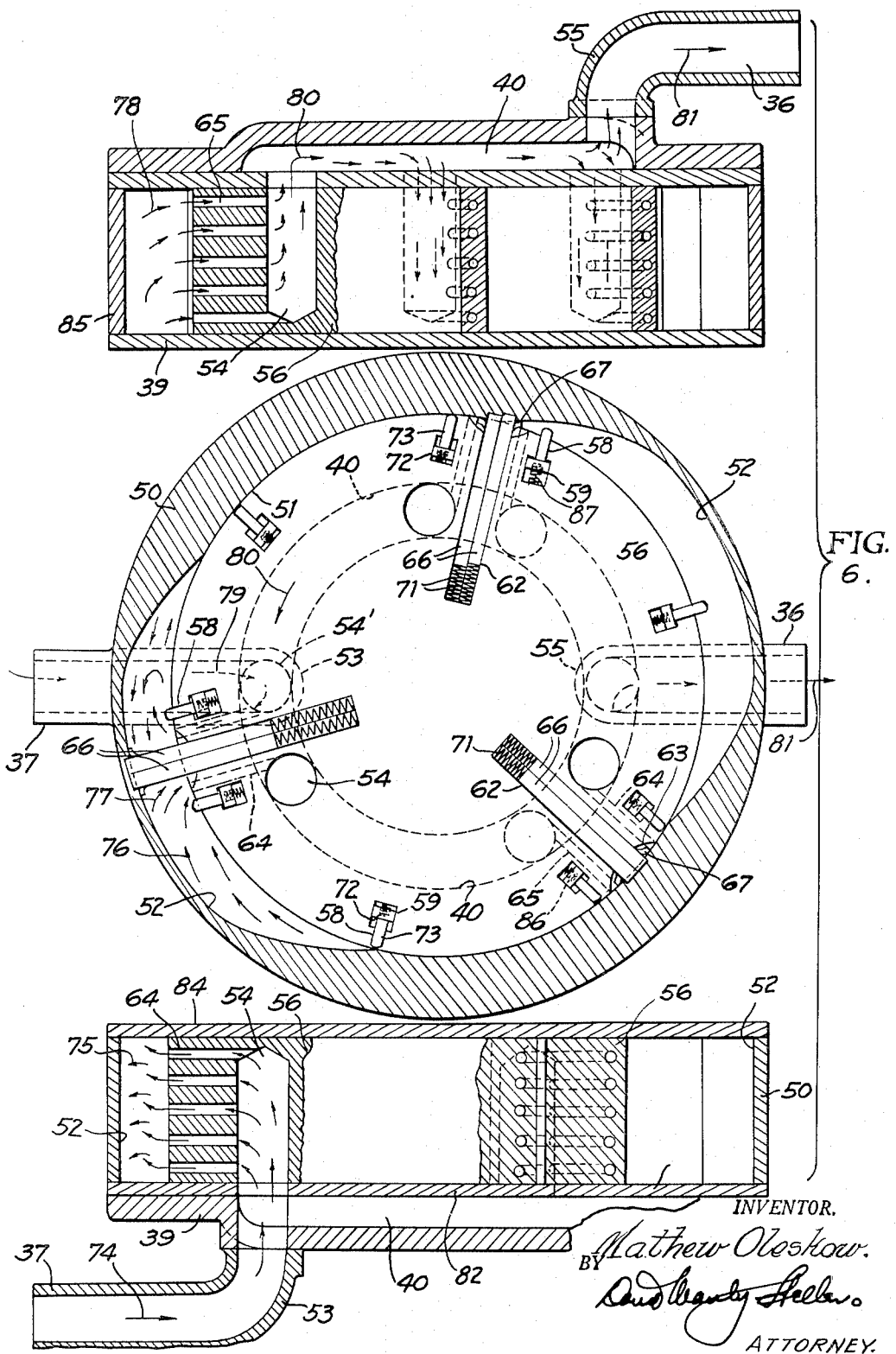

United States Patent Office 2,752,893
Patented July 3, 1956

2,752,893

FLUID MOTOR

Mathew Oleskow, Chicago, Ill.

Application June 10, 1953, Serial No. 360,745

3 Claims. (Cl. 121—82)

My invention relates to rotary units which may be utilized as hydraulic pump and/or hydraulic transmission means.

An important object of my invention is to provide hydraulic pump and/or hydraulic transmission means which is associated with prime mover means and is particularly adapted for use with slow moving vehicles such as caterpillar tractors, and crane devices or like slow moving machinery.

Another object of my invention is to provide an hydraulic mechanism of the aforementioned character which consists of a stator in which is mounted a rotor the said stator being provided with diametrically opposed internal cam means, the said rotor being provided with dual and independently operable spring urged vane means adapted to ride the peripheral portion of the said internal cam means in order to enable the hydraulic substance, or the liquid, to motivate the said rotor, transmitting power to drive one or more rotating units selectively in a forward direction, a rearward direction, or optionally, to motivate either one of the rotating elements to which it may be connected.

A still further object of my invention is to provide an hydraulic unit which may be associated with a prime mover and acting as an hydraulic converter for the said prime mover.

A still further object of my invention is to provide, in an hydraulic pump or transmission means of the aforementioned character, leading and trailing seal means associated with the said vane means and positioned forwardly and aft thereof, in order to act as hydraulic seals, and to provide a transmission sealed against leakage of the hydraulic means utilized so as to impart thereto the full power transmission originally supplied by the prime mover means, except for slight frictional losses.

A still further object of my invention is to provide an hydraulic mechanism of the aforementioned character which is simple in construction, very effective in its operation and efficient for the purposes for which it is purported to be used, and an assembled structure of such simple arrangement and machining requirements as to permit manufacturing the same economically in quantity production.

Other objects, features and advantages resident in my invention will become apparent from an examination of the accompanying drawings bearing further elucidation in the ensuing description wherein like symbols are used to designate like parts, and in which;

Fig. 1 is an enlarged elevational view with the cover removed so as to depict and illustrate clearly the internal mechanism and structure of my fluid motor.

Fig. 2 is a cross-sectional view taken, substantially, on the lines 2—2 of Fig. 1.

Fig. 3 is a plan view in elevation of the rotor showing all other elements removed therefrom.

Fig. 4 is a cross-sectional view taken, substantially, on the lines 4—4 of Fig. 2.

Fig. 5 is a perspective view showing the detailed elemental structure of one of the vane eleents used in connection with the rotor mechanism of my invention.

Fig. 6 is a schematic view and is similar to Fig. 2 with the exception that the rotor mechanism has been rotated 90° and the remaining structure of Fig. 2 has been duplicated so that the path and flow of the hydraulic means may be clearly illustrated as indicated by the arrows in the said views, and showing schematically how the path of the liquid or hydraulic driving means passes through the rotor and stator units.

The pumping means and/or transmission means consists of the following elemental structure, all units being alike as indicated in Figs. 1–5, and as schematically indicated at Fig. 6 to further indicate the paths of the liquid through the units. Each of the units consists of a stator made up of two plates 39, one having an inlet 37, the other being equipped with an outlet 36, and the communicating annular chambers, preferably, of semicircular section 40.

The said plates are connected to a central cam 50 having an internal cam race provided with a circular portion 51 merging with the cam recess 52 at diametrally opposed points as indicated in Fig. 3. The rotor designated 56 operates within the confines of the radial or arcuate portion 51 and is provided with three slotted portions 52 having also angularly chamfered clearance notches 63 as will hereinafter appear necessary in order to confine the vane units 66 therein.

The rotor is also provided with a splined opening 35 to be secured to a member 34 to be driven such as the axle of the wheels. The rotor is also provided with bores operatively disposed and designated 54 and 54', the bores 54 having communicating drilled openings 64 and the bores 54' having similar drilled openings designated 65. The rotor is preferably secured to two plates 82, and is recessed at 83 in order to locate the same firmly in place so as to provide a smooth rotor and to operate between the stator plates 39.

The cam 50 which confines the rotor will thus permit the rotor to operate therein whenever it is motivated, the rotor in turn either being driven when the action of the unit will be that of an hydraulic pump, or when connected to a driven member, such as a wheel axle, the function of the unit being as an hydraulic motor.

The plates 82 are secured to the rotor by means of flush rivets 61 assembled through the bores 60. The stator plates 39 are secured to the cam 50 by means of cap screws 38 or any other secure fastening.

The inlet 37 is provided with an elbow extension 53 communicating with the bore 54 whereas the outlet 36 is provided with an elbow 55 which communicates with another bore 54' and as the liquid is fed in through the inlet 37 it will reach the outlet by virtue of passing through the blind bores 54, passing through the communicating drilled openings 64 thence through the drilled openings 65 through the opposing blind bore 54' and ultimately into the elbow extension 55 completing the cycle of hydraulic operation and leaving through the outlet 36.

When the unit functions to drive in the reverse direction the outlet 36 becomes the inlet and the inlet 37 becomes the outlet, thus reversing the operation.

The rotor has the splined hub 35 which has nut 74 securing in place the end thrust bearings 75 and mounting inwardly thereof the hydraulic seals 76 so that the entire unit is liquid tight. Within the recesses 62, reference being had to Fig. 5, the independently sliding vanes 66 operate, which cause the rotation and which act as impellers for the rotor 56. The said vanes consist of a pair mounted in each recess 62 and are provided with oil and lubricating grooves 68 so as to permit smooth functioning, the ears 69 guiding on the face of the cam 50 laterally locating the said vanes 66, the vanes being also provided with a circumferentially formed or arcuately formed overlapping edge 67, so as to fit within the configuration of the cam recess 51, 52 and provide a good seal therebetween.

The said vanes 66 operate independently, depending on the configuration of the cam functioning therewithin, and are urged in contactual relationship with the cam recess 51, 52, at all times by the springs 71 confined within the bores 70. Thus, when liquid is forced to enter cavity 59 it will impel the vane in one direction, whereas the opposing part of the cavity 59 will cause the liquid to flow through the opposing bore 54' and thus cause the unit to be revolved in a circular direction.

In order to assure proper fluid and hydraulic action I provide leading and trailing valve seals which consist of flat pieces of metal 72 having reduced tongues 73 operating within the confines of the recesses 59, the tongues slidably operating within the open slot 58. Thus, a fore and aft seal is provided for the liquid, and definitely confines the path of the liquid to the bores 54, 54' and the communicating drilled openings 64 and 65 controlling the same to effectively exert all of the power and motion imparted to the fluid by the prime mover 9. The trailing and leading valve seals are also provided with spring means 87 in the hollow bores 86, so that the same will be always urged upwardly and be caused to depress when reaching the lower part of the cam curve 51.

Primarily the seals will act upon the low curve 51, as illustrated in Fig. 3. They will be inoperative or inactive in the travel when the rotor 56 has the vanes 66 travelling within the ambit of the valve seal recess or pocket 59. The structure thus illustrated exemplifies an operation which perhaps schematically can be more readily followed by attention to the illustration of Fig. 6 which is a composite schematic illustration showing the rotor isolated from the two views which really would mean that the sections designated 84, 85 are to be in superimposition and the rotor 56 is to be rotated 90° on its longitudinal axis and also merged into the confines of the sections 84, 85 to form the stator.

It will be noted that the inlet 37 indicates that the path of the fluid will follow along the lines indicated by the arrows 74 and 75 through the drilled openings 64, after having passed through the bore 54, then follow through in the direction of arrows 76 and 77, passing through the drilled openings 65 as indicated by the arrows 78 and then through arrow 79 through the bore 54' and within the annular passage 40, following the path of the arrow 80 and ultimately coming through the like arrangements of bores 54 and 54' when they align respectively with the outlet 36, the fluid ultimately completing the cycle and passing out as indicated by arrow 81. Arrows 78, 65 and the bore 54' are also indicated in the section to the right of Fig. 6, which is similar to the section at the left of the rotor 56, thus showing how the arrows will indicate the path of the liquid or fluid used in order to drive the rotor in a selected direction.

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus described and revealed my invention, what I claim as new and desire to secure by Letters Patent is:

1. Rotary hydraulic motor means, comprising a stator structure provided with inlet means and outlet means, and annular conduits connected to the said inlet means and to the said outlet means, internal cam means in the said stator structure, a rotor mounted in the said stator structure and provided with splined journal means for attachment to an element to be rotated, thrust bearings secured to the outer ends of said splined journal means, nut elements securing said splined journal means to said bearings and simultaneously reenforcing said stator structure, dual independently operative and spring urged vane means slidably mounted peripherally in slots in the said rotor, blind bores on opposed faces of the said rotor adjacent the said slots and adapted to register with the said annular conduits, and drilled bores on the peripheral portion of the said rotor and communicating with alternate of the said blind bores to permit a hydraulic medium to flow therethrough causing the said vanes to become impellers to rotate the said rotor, the said vane means being provided with lateral gauging ears, and further provided with overlapping edges to effectuate a liquid tight seal to the said vane means, guide slots on the peripheral portion of the said rotor adjacent the first vertical slots, and spring-urged leading and trailing means slidably mounted in the said guide slots.

2. Rotary hydraulic motor means, comprising a stator structure provided with inlet means and outlet means, and annular conduits connected to the said inlet means and to the said outlet means, internal cam means in the said stator structure, a rotor mounted in the said stator structure and provided with splined journal means for attachment to an element to be rotated, thrust bearings secured to the outer ends of said splined journal means, nut elements securing said splined journal means to said bearings and simultaneously reenforcing said stator structure, dual independently operative and spring urged vane means slidably mounted peripherally in slots in the said rotor, blind bores on opposed faces of the said rotor adjacent the said slots and adapted to register with the said annular conduits, and drilled bores on the peripheral portion of the said rotor and communicating with alternate of the said blind bores to permit a hydraulic medium to flow therethrough causing the said vanes to become impellers to rotate the said rotor, the said vane means being provided with lateral gauging ears, and further provided with overlapping edges to effectuate a liquid tight seal to the said vane means, the said slots being chamfered at the open edges thereof to afford clearance to the operation of the said vane means.

3. Rotary hydraulic motor means, comprising a stator structure provided with inlet means and outlet means, and annular conduits connected to the said inlet means and to the said outlet means, internal cam means in the said stator structure, a rotor mounted in the said stator structure and provided with splined journal means for attachment to an element to be rotated, thrust bearings secured to the outer ends of said splined journal means, nut elements securing said splined journal means to said bearings and simultaneously reenforcing said stator structure, dual independently operative and spring urged vane means slidably mounted peripherally in slots in the said rotor, blind bores on opposed faces of the said rotor adjacent the said slots and adapted to register with the said annular conduits, drilled bores on the peripheral portion of the said rotor and communicating with alternate of the said blind bores to permit a hydraulic medium to flow therethrough causing the said vanes to become impellers to rotate the said rotor, the said vane means being provided with lateral gauging ears, and further provided with overlapping edges to effectuate a liquid tight seal to the said vane means, guide slots on the peripheral portion of the said rotor adjacent the said first vertical slots, and spring-urged leading and trailing seal means slidably mounted in the said guide slots, the said slots being chamfered at the open edges thereof to afford clearance to the operation of the said vane means.

References Cited in the file of this patent

UNITED STATES PATENTS

| | | |
|---|---|---|
| 230,907 | Thibalt et al. | Aug. 10, 1880 |
| 447,535 | Billings et al. | Mar. 3, 1891 |
| 459,381 | Stocker | Sept. 8, 1891 |
| 704,637 | Hodgson | July 15, 1902 |
| 781,028 | Smith et al. | Jan. 31, 1905 |
| 868,841 | Calkins | Oct. 22, 1907 |
| 1,811,729 | Molkenbur | June 23, 1931 |
| 1,859,618 | Cleland | May 24, 1932 |
| 1,977,780 | Stageberg | Oct. 23, 1934 |
| 2,046,517 | Jones | July 7, 1936 |
| 2,208,074 | Holz | July 16, 1940 |
| 2,382,259 | Rohr | Aug. 14, 1945 |
| 2,393,324 | Joy | Jan. 22, 1946 |
| 2,632,398 | Ferris | Mar. 24, 1953 |

FOREIGN PATENTS

| | | |
|---|---|---|
| 179,684 | Great Britain | May 17, 1922 |